US010384089B2

(12) United States Patent
Vaccari et al.

(10) Patent No.: US 10,384,089 B2
(45) Date of Patent: Aug. 20, 2019

(54) PROCESS FOR THE DISPOSAL OF ACID WASTES COMBINING THEM WITH ASBESTOS CONTAINING MATERIALS AND/OR CONCRETE

(71) Applicant: TBA Tech Corp, Weston, FL (US)

(72) Inventors: Bruno Vaccari, Rome (IT); Tullia Zucca, Comazzo (IT)

( * ) Notice: Subject to any disclaimer, the term of this patent is extended or adjusted under 35 U.S.C. 154(b) by 106 days.

(21) Appl. No.: 15/721,683

(22) Filed: Sep. 29, 2017

(65) Prior Publication Data

US 2018/0085613 A1    Mar. 29, 2018

Related U.S. Application Data

(63) Continuation-in-part of application No. 15/299,398, filed on Oct. 20, 2016, now abandoned.

(60) Provisional application No. 62/320,934, filed on Apr. 11, 2016.

(51) Int. Cl.
| | |
|---|---|
| *A62D 3/02* | (2007.01) |
| *A62D 3/36* | (2007.01) |
| *A62D 3/10* | (2007.01) |
| *A62D 3/19* | (2007.01) |
| *B09B 3/00* | (2006.01) |
| *A62D 3/20* | (2007.01) |
| *A62D 101/41* | (2007.01) |

(52) U.S. Cl.
CPC ............... *A62D 3/36* (2013.01); *A62D 3/02* (2013.01); *A62D 3/10* (2013.01); *A62D 3/19* (2013.01); *A62D 3/20* (2013.01); *B09B 3/00* (2013.01); *B09B 3/0066* (2013.01); *A62D 2101/41* (2013.01); *A62D 2203/02* (2013.01)

(58) Field of Classification Search
CPC ... A62D 3/02; A62D 3/10; A62D 3/20; A62D 3/36; B09B 3/0066
USPC .......................................... 588/411
See application file for complete search history.

(56) References Cited

U.S. PATENT DOCUMENTS

2003/0146310 A1* 8/2003 Jackson ................. A62D 3/19
239/690

* cited by examiner

*Primary Examiner* — Edward M Johnson
(74) *Attorney, Agent, or Firm* — H. John Rizvi; The Patent Professor (57) ABSTRACT

An accelerated process for the complete neutralization of acid wastes, the destruction of concrete and/or the denaturation of asbestos-containing materials (ACMs) includes forming a slurry or suspension by submerging in the acid solution the concrete and/or asbestos-containing materials (ACMs); the concrete and/or asbestos-containing materials (ACMs) cause the acid wastes neutralizing chemical reactions in the slurry or suspension and, at the same time, the destruction of concrete and/or the denaturation of asbestos-containing materials (ACMs). Simultaneously to the chemical reactions, the slurry or suspension is subjected to hydrodynamic cavitation, preferably using an apparatus capable of producing and managing three types of simultaneous controlled cavitation acting in the same space volume, accelerating the chemical reactions taking place in the slurry due also to the simultaneous presence of acid, concrete and/or asbestos-containing materials (ACMs). The concrete and/or asbestos-containing materials (ACMs) are preferably ground and polarized prior to be submerged in the acid solution to form the slurry. The polarization take place, for the really first time, with a cold plasma torch. In addition the slurry or suspension is preferably subjected to hydrothermal treatment, preferably using a reactor which ensures the preservation of the constancy of the ideal physical parameters for the reaction in the physical chemical environment. In this reactor are additivated chemicals, hydroxyapatite and biological substances that have binder/chelating power especially on metals contained in asbestos, especially on magnesium, in order to prevent its reformation. Recovering, at the end of the process, inert secondary raw materials (SRMs) that are non-hazardous to the environment and human health. In addition, this process could be used to produce molecules that are important intermediates of the subsequent reactions/processes, leading to the formation of salts/compounds used as dietary supplements and also in important environmental remedies such as polluted water reclamation and the treatment of heavily polluted soils.

20 Claims, 3 Drawing Sheets

PROCESS FOR THE DISPOSAL OF ACID WASTES COMBINING THEM WITH ASBESTOS CONTAINING MATERIALS AND/OR CONCRETE

CROSS-REFERENCE TO RELATED APPLICATIONS

This application is a Continuation-In-Part of co-pending U.S. Utility patent application Ser. No. 15/299,398, filed on Oct. 20, 2016, which in turn claims the benefit of U.S. Provisional Patent Application Ser. No. 62/320,934, filed on Apr. 11, 2016, which are incorporated by reference herein in their entirety.

FIELD OF THE INVENTION

The present invention generally relates to processes for the treatment of acid wastes using asbestos-containing materials (ACMs) and/or concrete. More particularly, the present invention relates to a continuous cycle process for the disposal of acid wastes that in the same time destruct asbestos-containing materials (ACMs) and/or concrete using synergistic physical, biological, and chemical treatments recovering inert secondary raw materials (SRMs) that are non-hazardous to the environment and human health. The already well-known chemical reaction generated by the contact between acid wastes and cement part present in asbestos-containing materials (ACMs) and/or concrete, in our invention it is stabilized by additivation of binding/chelating chemicals, hydroxyapatite and molecules of the same kind or naturally similar, both natural (fishery waste, shells of eggs, bones of both terrestrial and marine animals, etc.) or synthetic. In our invention can be indiscriminately used all natural or synthetic molecules which have the power to bind the metals contained in the asbestos in order to not let to reform it. These molecules will chelate the metals that form the asbestos, mainly magnesium, preventing that the chemical balance could permit the reconstitution of harmful crystals. The phosphorus brought by these materials will enrich the process by-products also allowing the production of excellent quality agricultural fertilizers.

In addition, this process could be used to produce molecules that are important intermediates of the subsequent reactions/processes, leading to the formation of salts/compounds used as dietary supplements. These can be used in the pharmaceutical industries, in other productive sectors, and also in important environmental remedies such as polluted water reclamation and the treatment of heavily polluted soils. The salts/chelates molecules produced in this process, mainly composed of magnesium, when enter in contact with heavy metals tend to chelate the latter because they have a greater affinity, replacing them in the complex with magnesium and other harmless metals or even beneficial for water and so they can remove heavy metals from polluted waters and soils.

BACKGROUND OF THE INVENTION

Concrete is a mixture of paste and aggregates, or rocks. The paste, composed of cement and water, coats the surface of the fine (small) and coarse (larger) aggregates. Through a chemical reaction called hydration, the paste hardens and gains strength to form the rock-like mass known as concrete. Within this process lies the key to a remarkable trait of concrete: it's plastic and malleable when newly mixed, strong and durable when hardened. These qualities explain why one material, concrete, can build skyscrapers, bridges, sidewalks and superhighways, houses and dams.

Cement's chemistry comes to life in the presence of water. Cement and water form a paste that coats each particle of stone and sand—the aggregates. Through a chemical reaction called hydration, the cement paste hardens and gains strength. The quality of the paste determines the character of the concrete. The strength of the paste, in turn, depends on the ratio of water to cement. The water-cement ratio is the weight of the mixing water divided by the weight of the cement. High-quality concrete is produced by lowering the water-cement ratio as much as possible without sacrificing the workability of fresh concrete, allowing it to be properly placed, consolidated, and cured. A properly designed mixture possesses the desired workability for the fresh concrete and the required durability and strength for the hardened concrete. Typically, a mix is about 10 to 15 percent cement, 60 to 75 percent aggregate and 15 to 20 percent water. Entrained air in many concrete mixes may also take up another 5 to 8 percent.

Curing begins after the exposed surfaces of the concrete have hardened sufficiently to resist marring. Curing ensures the continued hydration of the cement so that the concrete continues to gain strength. Concrete surfaces are cured by sprinkling with water fog, or by using moisture-retaining fabrics such as burlap or cotton mats. Other curing methods prevent evaporation of the water by sealing the surface with plastic or special sprays called curing compounds. Special techniques are used for curing concrete during extremely cold or hot weather to protect the concrete. The longer the concrete is kept moist, the stronger and more durable it will become. The rate of hardening depends upon the composition and fineness of the cement, the mix proportions, and the moisture and temperature conditions. Concrete continues to get stronger as it gets older. Most of the hydration and strength gain take place within the first month of concrete's life cycle, but hydration continues at a slower rate for many years. Hydration involves many different reactions, often occurring at the same time. As the reactions proceed, the products of the cement hydration process gradually bond together the individual sand and gravel particles and other components of the concrete to form a solid mass. The empirical formula of concrete can be written as:

$$2Ca_3SiO_5 + 7H_2O \rightarrow 3(CaO).2(SiO_2).4(H_2O)(gel) + 3Ca(OH)_2$$

where the exact ratios of the CaO, SiO2 and H2O in C—S—H can vary.

Many types of concrete are available, distinguished by the proportions of the main ingredients used. In this way or by substitution for the cementitious and aggregate phases, the finished product can be tailored to its application. Strength, density, as well chemical and thermal resistance are variables. Concrete production is the process of mixing together the various ingredients—water, aggregate, cement, and any additives—to produce concrete. Concrete production is time-sensitive. Once the ingredients are mixed, workers must put the concrete in place before it hardens.

Concrete has a relatively high compressive strength and a lower tensile strength. To void this weakness, it is usually reinforced with materials that are strong in tension. The elasticity of concrete is relatively constant at low stress levels but starts decreasing at higher stress levels as matrix cracking develops. Concrete has a very low coefficient of thermal expansion and shrinks as it matures. All concrete structures crack to some extent, due to shrinkage and tension. Concrete that is subjected to long-duration forces is prone to creep. Different mixes of concrete ingredients produce different strengths. Concrete can be damaged by many processes, such as the expansion of corrosion products of the steel reinforcement bars, freezing of trapped water, fire or radiant heat, aggregate expansion, sea water effects, bacterial corrosion, leaching, erosion by fast-flowing water, physical damage and chemical damage (from carbonatation, chlorides, sulfates and distillate water).

Concrete recycling is an increasingly common method for disposing of concrete structures. Concrete debris was once routinely shipped to landfills for disposal, but recycling is increasing due to improved environmental awareness, governmental laws and economic benefits. Concrete, which must be free of trash, wood, paper and other such materials, is collected from demolition sites and put through a crushing machine, often along with bricks and rocks. Reinforced concrete contains rebar and other metallic reinforcements, which are removed with magnets and recycled elsewhere. Crushed recycled concrete can sometimes be used as the dry aggregate for brand new concrete if it is free of contaminants, though the use of recycled concrete limits strength and is not allowed in many jurisdictions. On 3 Mar. 1983, a US government-funded research team estimated that almost 17% of worldwide landfill was by-products of concrete based waste.

In 1923, Bronsted and Lewis, separately, introduced the modern acid nomenclature. The first saw them as molecules capable of delivering an Hydrogen ion to other molecules that could accept it, and drew attention to the fact that the dimensionally tiny hydrogen ion could create a giant electric field in proportion, hence a very high polarization of the space around it. Lewis revolutionized the concept of acid by dislodging the concept from hydrogen ion and, indeed, from hydrogen itself. Due of this scientist, today we call acids compounds that do not even contain hydrogen ions: an example is BF3, Boro Trifluoride, which also disputes the common acid concept as a liquid in aqueous solution, being gaseous at a temperature above 12 degrees Celsius at atmospheric pressure. Such molecule categories are called Lewis Acids and have the feature of having an electronic duplex, in an outer orbital of the atom, not engaged in a chemical bond and behave in a particular way to the point that it is referred to as "Lone pair". Lewis classified protonic acids as secondary acids by reserving the title of primary acids to those who are able to accept the pair of Lone Pairs electrons. Therefore, based on the Lewis classification, the hydrochloric acid HCl, the Sulfuric acid H2SO4, etc., are not primary acids due they are complex molecules of electrons and therefore cannot accept Lone Pairs.

Therefore, acid as a chemical molecule that if isolated, homogeneous and marketable, is not a waste but a value, finding on the market always a viable location and virtually immediate saleability. If, however, the acid is mixed with other substances, it is hardly recoverable with an economically viable process. At these conditions, it becomes a waste and therefore its disposal has an high cost, because it is necessary to treat it to make it harmless. The optimal disposal process for these acid waste is the one that does not just destroy the molecule, but let them react obtaining other products that are still valid on the market or even more valid and beneficial for human health and/or the environment than the one from which start the process.

An acid is a molecule or ion capable of donating a hydron (proton or hydrogen ion H+), or, alternatively, capable of forming a covalent bond with an electron pair (a Lewis acid). Acidity (or the amount of acid in a given substance) is measured with a number called pH, and acids have a pH less than 7. Chemically, acids are chemicals that contain positive hydrogen ions. The strength of an acid refers to its ability or tendency to lose a proton. A strong acid is one that completely dissociates in water; in other words, one mole of a strong acid HA dissolves in water yielding one mole of H+ and one mole of the conjugate base, A–, and none of the protonated acid HA. In contrast, a weak acid only partially dissociates and at equilibrium both the acid and the conjugate base are in solution. There are numerous uses for acids. In the chemical industry, acids react in neutralization reactions to produce salts. Acids are used as catalysts in industrial and organic chemistry.

Acid solutions treatment/neutralization is exothermic and may be potentially hazardous. It is important to dispose of acids with very low pH (<2) safely. If the acid doesn't have heavy metals or other toxic substances dissolved in it, neutralizing the pH to a less acidic level (pH 6.6-7.4) allows to dispose of the substance in the standard sewer system. If heavy metals are present, the solution must be treated as hazardous waste and disposed of through the proper channels. Some hazardous wastes were disposed of in regular landfills. This resulted in unfavorable amounts of hazardous materials seeping into the ground. These chemicals eventually entered to natural hydrologic systems. Many landfills require countermeasures against groundwater contamination.

Asbestos is a fibrous material which includes mineral silicates having a markedly fibrous asbestiform mineral growth habit and belonging to the amphibole or serpentine families. The mineral silicates are made up of incombustible, chemically-resistant, inert, phono-absorbing, flexible and tensile fibers. Asbestos mineral deposits can be found throughout the world and are still mined in Australia, Canada, South Africa and the former Soviet Union.

The chemical and physical properties of asbestos, namely its heat resistance, tensile strength and insulating properties, have rendered it one of the most important inorganic materials for industrial uses and technological applications. Asbestos minerals have been used in the construction of building materials such as cement products, acoustic and thermal sprays, pipe and boiler wraps, flooring and roofing materials, plasters, paints and many others.

Asbestos is characterized by a crystal formation of long, thin fibers, which makes asbestos quite different from other materials. Based upon its crystalline structure, asbestos may be classified as either serpentine or amphibole.

Serpentine asbestos has a sheet or layered structure. Serpentine minerals are usually associated with ultramafic Mg-rich rocks such as altered basalt which have been changed at different temperatures and in the presence of water in an alteration process known as serpentinization. The only member of the serpentine group, chrysotile, also known as "white asbestos", is the most common type of asbestos found in buildings and is the predominant fibrous form of serpentine. Chrysotile is a fibrous mineral which does not burn or rot, is resistant to most chemicals, is flexible and possesses high tensile strength. This unique combination of properties makes chrysotile ideal as a major component of lightweight reinforced cement products, friction materials, high temperature seals, gaskets and a host of other materials. Chrysotile has been known for over 2000 years, being used initially for cremation cloths, oil lamp wicks and other textiles. In the 19th Century, chrysotile was first mined commercially in the Urals (Russia), Italy and Canada. Although it is the least abundant of the three traditional serpentine minerals, chrysotile accounts for some 95% of world asbestos production, and hence, is of key importance when the health effects of serpentine dust are considered. Chrysotile makes up approximately 90 to 95% of all asbestos used in buildings in the United States.

Amphibole asbestos, in turn, has a chain-like structure. There are five types of asbestos in the amphibole group: (1) amosite, which is the second most prevalent type of asbestos found in building materials and is also known as "brown asbestos"; (2) crocidolite, or "blue asbestos," which is used in specialized high-temperature applications; (3) anthophyllite; (4) tremolite; and (5) actinolite. Anthophyllite, tremolite and actinolite are rare and are mainly present as contaminants in other minerals.

The amphibole group of minerals that include crystalline asbestos is based on the double-chain silicate tetrahedral structure which is cross-linked with bridging cations including magnesium, iron, calcium and sodium. The basic structural unit of amphiboles is (Si4O11)-6. The empirical formula of amphiboles can be written as:

$$W_{0-1}X_2Y_5Z_8O_{22}(OH,F)_2$$

where $W=Na^{+1}$ or $K^{+1}$ in the A site with 10 to 12 fold coordination; $X=Ca^{+2}, Na^{+1}, Mn^{+2}, Fe^{+2}, Mg^{+2}, Fe^{+3}$, in an M4 site with 6 to 8 fold coordination; $Y=Mn^{+2}, Fe^{+2}, Mg^{+2}, Fe^{+3}, Al^{+3}$ or $Ti^{+4}$ in an Ml octahedral coordination site; and $Z=Si^{+4}$ and $Al^{+3}$ in the tetrahedral site.

The empirical formula of crocidolite (riebeckite asbestos) can be written as Na2 (Fe2+, Mg)3 Fe3+2 Si8 O22 (OH)2. Iron can be partially substituted with Mg2+ within the crocidolite structure. Crocidolite fiber bundles typically easily disperse into fibers that are shorter and thinner than other amphibole asbestos fibers which are similarly dispersed. However, crocidolite fibrils are generally not as small in diameter as chrysotile fibrils. In comparison with other amphiboles or chrysotile, crocidolite has a relatively poor resistance to heat. Its fibers, instead, are used extensively in applications requiring good resistance to acids. Crocidolite fibers have fair to good flexibility, fair spinnability, and a texture ranging from soft to harsh.

In amosite (grunerite asbestos), the Fe2+ to Mg2+ ratio varies, but is usually about 5.5:1.5. Amosite fibrils are generally larger than crocidolite fibrils, but are smaller than particles of anthophyllite asbestos similarly comminuted. Amosite fibrils typically have straight edges and characteristic right-angle fiber axis terminations.

Anthophyllite asbestos is a relatively rare, fibrous, orthorhombic, magnesium-iron amphibole, which occasionally occurs as a contaminant in talc deposits. Anthophyllite fibrils are typically more massive than those of other common forms of asbestos.

Finally, tremolite asbestos (a monoclinic calcium-magnesium amphibole) and actinolite asbestos (an iron-substituted derivative of tremolite asbestos) rarely occur in the asbestos habit and yet are common as contaminants of other asbestos deposits. Actinolite asbestos occurs as a contaminant fiber in amosite deposits, whereas tremolite asbestos occurs as a contaminant of both chrysotile and talc deposits. Tremolite asbestos fibrils range in size but may approach the dimensions of crocidolite and amosite fibrils.

The mechanisms of amphibole breakage are important biologically with regard to resultant particle number, surface area and general respirability (all of which control penetration to target cells and delivered dose), and also with regard to expressed chemical information contained on the fiber surface.

In nature, asbestos samples usually contain different cations from those used to describe the double-layer structure. Al+3 and Fe+3 may substitute for Si+4, and Fe+2, Fe+3, Mn+2 and Ni+2 can all substitute for Mg+2 to a greater or lesser degree. These substitutions may be summarized in a chemical formula written as:

$$(Mg_{3-x-y}R_x^{+2}R_y^{+3})(Si_{2-y}R_y^{+3})O_5(OH)_4$$

where $R^{+2}=Fe^{+2}, Mn^{+2}$ or $Ni^{+2}$ and $R^{+3}=Al^{+3}$ or $Fe^{+3}$.

Normally, asbestos-containing materials (ACMs) in buildings do not pose a hazard to occupants and workers in those buildings except when asbestos fibers become airborne and are inhaled. In other words, intact, undisturbed asbestos-containing materials generally do not pose a health risk. It is when the asbestos-containing materials are damaged, disturbed or deteriorated over time that the asbestos-containing materials release asbestos fibers into the air inside the buildings and may become hazardous and pose an increased risk. As a toxic substance and known carcinogen, asbestos can cause several serious diseases in humans. Symptoms of these diseases typically develop over a period of years following asbestos exposure.

Because it has been unquestionably linked to lung cancer, asbestosis and pleural mesothelioma, asbestos is now considered to be a human health hazard. Furthermore, the use of asbestos is currently forbidden in several technologically-advanced countries.

Each country may set its own standards as to the definition of a hazardous or dangerous asbestos-containing material. For instance, the Environmental Protection Agency (EPA) in the U.S. classifies any material containing more than 1 wt % asbestos as an asbestos-containing material (ACM); a similar classification is defined in Italy by D. L. 277, 15 Aug. 1991.

Asbestos-containing materials can be basically divided into friable and compact asbestos materials. Friable asbestos designates any asbestos-containing material that can be easily crumbled or powdered when dry, and is normally composed of 70 to 95 wt % asbestos fibers. In general, friable asbestos in building materials can be found in artificial ashes and embers for gas-fired fireplaces, cavities, partitions of floors and ceilings, insulation of electrical wires, and insulation of panels, etc. In turn, compact asbestos designates an asbestos-containing material consisting in a composite material in which asbestos fibers are embedded in a cement or polymeric matrix. Compact asbestos is not prone to release fibers unless it is sawed or scratched by mechanical tools. In general, compact asbestos in building materials can be found in bonding and finishing cements, masonry fillers, mortars, mastics, asbestos-cement products having generally 4 to 15 wt % chrysotile asbestos and/or 0 to 6 wt % amphibole asbestos, etc.

A number of methods, some of which are patented, have been proposed to destroy or disrupt the molecular structure of asbestos and render asbestos less harmful to human health. The main processes used to transform asbestos into inert materials have been traditionally based on chemical treatment (typically by applying acid), thermal treatment and mechanochemical treatment. More recently, methods using a biochemical and microbiological approach have been developed.

Regarding acid-based chemical treatments, various methodologies that include the use of organic or mineral acids have been developed for the transformation of asbestos-containing materials and the rendering of secondary, recyclable and often reusable materials. In particular, mineral acids such as hydrofluoric acid, hydrochloric acid and sulfuric acid, as well as organic acids such as formic acid and oxalic acid, have been used to treat asbestos.

Regarding thermal treatments, it is well-known that dehydroxylation of chrysotile asbestos occurs in the range 650 to 750° C. It is also known that, at around 1000° C., the fibrous structure of chrysotile asbestos becomes loose and a new crystalline structure (forsterite and/or enstatite) is formed. Further, amphiboles such as crocidolite asbestos decompose at around 1050 to 1100° C. through a complex reaction path involving iron oxidation, which leads to formation of pyroxene, enstatite, hematite and cristobalite. Tremolite asbestos, in turn, decomposes into diopside, enstatite and cristobalite.

Vitrification is one of the most effective thermal processes for treatment of asbestos. The benefit of vitrification derives from the complete destruction of the fibrous structure and the formation of a glass-forming mixture which can be recycled as secondary glass material, due to the fact that asbestos-containing materials do not contain heavy metals. For instance, in the INERTAM-Europlasma process, vitrification of asbestos-containing materials is carried in a cylindrical furnace by a plasma torch at 1600° C. This is currently the only method of conversion of asbestos-containing materials that has been successfully adapted from a lab scale to a fixed, large-scale industrial plant. However, the process costs for rendering asbestos inert using this plasma-torch-based large-scale industrial process are, unfortunately, prohibitively high.

As to the biochemical and microbiological processes for treating asbestos, the best existing process known nowadays comprises the disintegration of the crystal planes of brucite (oxygen-magnesium) which are present within the crystalline planes of chrysotile as an indirect effect of metabolism of the bacterial cultures. Due to the presence of metabolites secreted by bacteria, decomposition of the crystal planes appears to be caused by acidification of the reaction environment. The process includes the steps of preparing an acid liquid/suspension by subjecting a food industry waste material to mixed bacterial and fungal growth and/or fermentation and treating the asbestos-containing materials with the acid solution/suspension obtained from the mixed fermentation at a temperature of 120 to 170° C. and a pressure of 2 to 10 bar. While this process may be effective, it requires from half a day to several days for completion, and is thus not sufficiently productive.

Regarding Hydroxyapatite (HAp) is a calcium phosphate chemically similar, in morphology and composition, to the mineral component of bones and hard tissues in mammals. It is one of few materials that are classed as bioactive, meaning that it will support bone ingrowth and osseointegration when used in orthopedic, dental and maxillofacial applications. The empirical formula of Hydroxyapatite can be written as:

The chemical nature of hydroxyapatite lends itself to substitution, meaning that it is not uncommon for non-stoichiometric hydroxyapatites to exist. The most common substitutions involve carbonate, fluoride and chloride substitutions for hydroxyl groups. Particularly, it has a hexagonal structure and a stoichiometric Ca/P ratio of 1.67, which is identical to bone apatite. An important characteristic of hydroxyapatite is its stability when compared to other calcium phosphates. Thermodynamically, hydroxyapatite is the most stable calcium phosphate compound under physiological conditions as temperature, pH and composition of the body fluids and it decomposes at temperature of about 800-1200° C. depending on its stoichiometry.

Accordingly, there remains a need for a safe disposal method capable of acids neutralization and destroy concrete and/or asbestos-containing materials (ACMs) that is not only applicable in large-scale industry, but also productive and non-hazardous to human health and the environment.

SUMMARY OF THE INVENTION

The present invention is directed to provide a continuous accelerated and complete method for the treatment of acid wastes using asbestos-containing materials (ACMs) and/or concrete obtaining the neutralization of acid solutions, the destruction of concrete and/or denaturation of asbestos-containing materials (ACMs) able to generate also resulting inert secondary raw materials (SRM) that are usable, marketable and non-hazardous to human health and the environment. The concrete and/or asbestos-containing materials treated in the processes of the invention may include both friable and compact matrix materials such as cement, polymer, mortar, and vinyl, and may contain asbestos in fibril form or in alternative forms. The process includes a synergistic combination of physical, biological and chemical processes which is capable to neutralize acid solutions, accelerating the destroying of cement parts and the consequent dissociation of the concrete and/or asbestos-containing materials to allow also the subsequent destruction of asbestos fibers eventually contained in the materials. This destruction splits the acid solutions, the concrete and/or the asbestos in the elements that compose them, and thus yields usable and marketable metals and chemicals.

Under optimal conditions, the synergistic process of the invention can successfully carry out a complete acid solutions neutralization, concrete destruction and/or denaturation of asbestos-containing materials in about 10 minutes with a continuous cycle. The invention thus provides a significant process time reduction in comparison to conventional neutralization, destruction and/or denaturation processes, the best of which require more than half a day and are not replicable in a secure manner outside a laboratory setting.

In a first implementation of the invention, a process for acid solutions neutralization and destruction of concrete and/or denaturation of asbestos-containing materials comprises a step were a slurry or a suspension is formed by immersing in the acid solutions the concrete and/or the asbestos-containing materials, and subjecting the forming slurry or suspension to a hydrodynamic controlled cavitation. Cavitation of the slurry intensifies and accelerates the chemical reactions taking place in the slurry and significantly reduces the total concrete and/or asbestos-containing materials destruction process time. The state-of-the-art of the process, as well as a further reduction of the time required for it, it is obtained by using a device capable to perform simultaneously three different kind of cavitation which act simultaneously in the same geometric space where the slurry containing the fibers transits. The three synergic cavitations are obtained thanks to a peculiar design of the device's interior which allows to recover a substantial part of the lost pressure in the passage as a lading drop of the fluid; this peculiar design was thought specifically for the dissolution of crystals. Therefore, compared to ordinary cavitation devices, pressure recovery lowers the energy needs of fluid handling and reduces the cost of the process, while at the same time make it more competitive, especially under an economic aspect, if compared to any other method for destroying concrete and/or denaturizing asbestos-containing materials (ACMs).

In a second aspect, the process includes a step of grinding the concrete and/or the asbestos-containing materials to obtain particles, prior to the step of forming a slurry or suspension, to increase the surface react area of the concrete and/or asbestos-containing materials and thus increase their reactivity to the acid solution. For instance, the concrete and/or asbestos-containing particles can have a size of about 0.1 to 50 millimeters.

In another aspect, the process includes a step of polarizing the concrete and/or asbestos-containing particles. The step of polarizing the particles include subjecting the concrete and/or asbestos-containing particles by a cold plasma torch, and preferably to a cold atmospheric pressure plasma torch.

In another aspect, the step of forming a slurry or suspension by applying at least concrete and/or asbestos-containing materials can include combining the acid solution with concrete and/or asbestos-containing materials. The acid solution can have a pH in the range of from 0 to 6, for instance and without limitation.

In another aspect, the acid solution can include inorganic and/or organic acid, which can optionally be obtained from a waste liquid originated in a separate industrial process. The waste acid can be optionally acidified. Selected genetically modified microorganisms can optionally be added to acidify the waste liquid. The genetically modified microorganisms can be selected to react with slurry components and to demolish the molecular structure of the slurry components.

In another aspect, the process includes a step of applying a hydrothermal treatment to the slurry or suspension, in loop with the step of subjecting the slurry or suspension to controlled cavitation. For instance and without limitation, the hydrothermal treatment may be carried out in a hydrothermal reactor at a temperature of about 50 to 300° C. and with an internal pressure from 1 to 60 atm. The state-of-the-art of this step will be reach using a reactor which ensures the preservation of the constancy of the ideal physical parameters for the reaction in the physical chemical environment of the asbestos destruction and preventing its reformation. To the slurry being processed, in this second reactor, are additivated acidic substances (eg: phosphoric acid, etc.) or acidifying substances (eg: salmon milt, etc.), aluminum and/or its compounds and other substances (eg: hydroxyapatite, other molecules also esadvented, biological substances such as pretreated bones, etc.) that have binder/chelating power especially on metals contained in asbestos, especially on magnesium, in order to prevent its reformation. These substances, in part of biological origin, after reacting with concrete and/or asbestos, they acquire the ability to chelate heavy metals while releasing the phosphorus and the magnesium captured during this process, thus becoming more suitable for purifying polluted waters and soils. Some of them may also be used in the pharmaceutical field. All with great environmental benefits.

In another aspect, the process includes at least a step of recovering inerts secondary raw material from the slurry or suspension, after the step of applying a hydrothermal treatment to the slurry or suspension, the secondary raw material includes at least one of a liquid, a solid and a gaseous material.

In another aspect, the asbestos-containing materials can include at least one of a friable or compact matrix material such as cement, concrete itself, gypsum, vinyl or a combination thereof.

In another aspect, the asbestos-containing materials can include natural rock containing asbestos, such as ophiolites.

In another aspect, the asbestos-containing materials can include any one of serpentine asbestos and amphibole asbestos.

In another aspect, concrete can include at least one of a friable or compact matrix material such as cement, coarse gravel, crushed rocks, sand or a combination thereof.

In another implementation of the invention, a method for acid solutions neutralization includes a step of forming a slurry or suspension by immersing in the acid solutions the concrete and/or the asbestos-containing materials. The slurry or suspension is subjected to hydrodynamic cavitation. A hydrothermal treatment is applied to the slurry or suspension, after the step of subjecting the slurry or suspension to cavitation, to produce at least one inert, secondary raw material.

In yet another implementation of the invention, a method for forming the slurry or suspension, before to add concrete and/or asbestos-containing materials to acid solution for its neutralization, comprises the steps of grinding the concrete and/or asbestos-containing materials to obtain concrete and/or asbestos-containing particles of preferably about 0.1 to 50 millimeters, and polarizing the concrete and/or asbestos-containing particles, preferably by a cold plasma torch. Next, a slurry or suspension is formed by applying the concrete and/or asbestos-containing particles to the acid solution. The acid solution reacting chemically with the concrete and/or asbestos-containing particles to neutralize, dissociate and disrupt the slurry components. Simultaneously to the reacting of the acid solution with the concrete and/or asbestos-containing particles, the slurry or suspension is subjected to hydrodynamic cavitation, the cavitation accelerating and intensifying the chemical reactions, in a continuous loop with a hydrothermal treatment, wherein the hydrothermal treatment is carried out in a hydrothermal reactor at a temperature of 50 to 300° C. and with an internal pressure from 1 to 60 atm. At least one inert liquid, solid or gaseous secondary raw material is recovered after the step of applying the hydrothermal treatment to the slurry or suspension.

In another implementation of the invention, a process for forming the slurry or suspension, before to add concrete and/or asbestos-containing materials to acid solution for its neutralization, comprises a step of grinding the concrete and/or asbestos-containing materials into concrete and/or asbestos-containing materials particles of about 0.1 to 50 millimeters. The concrete and/or asbestos-containing materials particles are then subjected by a cold plasma torch and polarized. Next, a slurry or suspension is formed by applying the concrete and/or asbestos-containing particles to the acid solution. In the slurry or suspension chemical reactions take place that dissociate and disrupting the components of the same. While the chemical reactions take place, the slurry or suspension is subjected to cavitation, the cavitation accelerating and intensifying the chemical reactions. A hydrothermal treatment will be applied to the slurry or suspension to then obtain resulting products including at least one of an inert or chemically inactive liquid, solid and gaseous product.

In yet another implementation of the invention, a process to arrange friable or compact concrete and/or asbestos-containing materials in order to be ready to be submerged into acid solution to form a slurry or suspension to neutralize acid solution includes the steps of grinding and polarizing concrete and/or asbestos-containing materials; preparing a suspension including acid solution and concrete and/or asbestos-containing materials, the acid solution optionally comprised in a waste liquid which optionally further includes genetically modified microorganisms; treating the suspension of the acid solution and concrete and/or asbestos-containing materials by a hydrodynamic cavitation; applying an hydrothermal treatment to the suspension and recovering products or Secondary Raw Materials (SRM) resulting from the hydrothermal treatment.

These and other objects, features, and advantages of the present invention will become more readily apparent from the attached drawings and the detailed description of the preferred embodiments, which follow.

BRIEF DESCRIPTION OF THE DRAWINGS

The preferred embodiments of the invention will hereinafter be described in conjunction with the appended drawings provided to illustrate and not to limit the invention, where like designations denote like elements, and in which:

FIG. 2 presents the validation of the cavitation process through the measurement of granulometry and dissolution. Firstly, a test was carried out by placing the material in a container with water and 5% hydrochloric acid under agitation: The results obtained by the granulometric distribution indicate a material with most particle (85%) particles between 100-1000 μm2. Subsequently, in order to validate the process, 4 kg of material, 36 liters of water and 8 liters of 5% HCl were placed in the cavitation apparatus. The analysis showed that test 3 generated samples with a finer granulometry than the first 2 tests passing from about 50% of particles 0-0.2 μm2 for the first two tests at about 70% for Test 3 Even with regard to granulometry greater than 0.2 μm2, it is observed a general increase of percentages up to 1 μm2 and a consequent decrease in percentages above 1 μm2. It follows that such material without cavitation has a significantly greater granulometry (over 85% between 100 and 1000 μm2) than that obtained after cavitation treatment in which over 50% has a granulometry of between 0-0.2 μm2.

Like reference numerals refer to like parts throughout the several views of the drawings.

DETAILED DESCRIPTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

The present invention is directed toward a continuous accelerated and complete process for the neutralization of acid wastes, the destruction of concrete and/or the denaturation of asbestos-containing materials (ACMs) using synergistic physical, biological and chemical treatments. As a result of the process, inert secondary raw materials (SRMs) that are usable, marketable and non-hazardous to human health and the environment are obtained.

Figure 1:
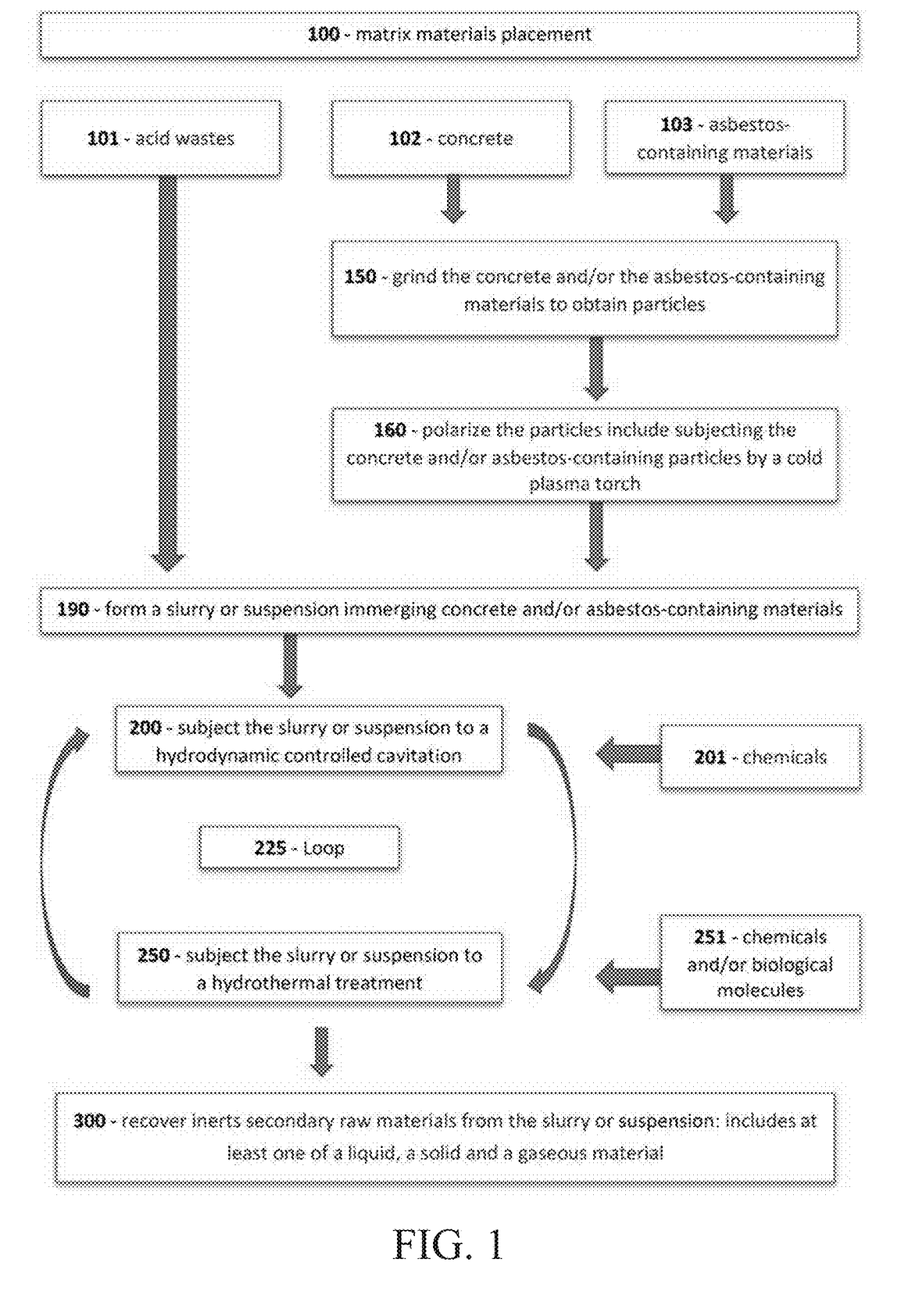
FIG. 1 presents a flow diagram of an accelerated process for the disposal of acid wastes, for the destroying of concrete and/or for the denaturation of asbestos-containing materials (ACMs) using synergistic physical, biological and chemical treatments with the addition of Chemicals and/or biological molecules, and for the recovery of inert secondary raw materials (SRMs) that are non-hazardous to human health and the environment.

Referring to the flow diagram in FIG. 1 in the drawings, an illustrative embodiment of an accelerated process for the substantially complete neutralization of acid wastes, the destruction of concrete and/or the denaturation of asbestos-containing materials (ACMs), hereinafter process in FIG. 1, is illustrated. In addition to acid wastes, the matrix comprise material such as, without limitation, cement, concrete, gypsum, vinyl or a combination thereof, with or without asbestos fibers contained in or carried by the matrix material. The process in FIG. 1 uses an innovative method to disrupt the molecular structure of the matrix, including asbestos fibers if present, in a short period of time and to full recycle the final product as secondary raw materials that are non-hazardous to human health and the environment. Generally, the process in FIG. 1 may be carried out in three main steps that will be indicated in the drawing as 100, 200 and 300. After main step 100, matrix materials placement (sub-steps 101, 102 and 103), the matrices follow different paths. At sub step 150 the concrete and/or asbestos-containing materials will initially be subjected to grinding to obtain asbestos-containing and/or concrete particles and, at sub step 160, these particles will be subjected to polarization. At sub step 190, the polarized particles obtained by grinding concrete and/or asbestos-containing materials will be submerged in the acid solutions to form a slurry or suspension. At main step 200, the slurry or suspension will be treated and added up with chemicals (sub step 201) so molecular structure of the matrix materials is neutralized, disrupted or denatured. The main step 200 is in a loop with the sub step 250 were the slurry will be subjected to a hydrothermal reaction, added up with other chemicals and/or biological molecules (sub step 251) to complete the transformation (main step 300) into inert materials that are non-hazardous to human health and the environment.

Step 100 of the process in FIG. 1 may include sub-steps 101, 102, 103, 150, 160 and 190. At sub-step 150, the concrete and/or asbestos-containing materials are initially ground to form concrete and/or asbestos-containing particles. Grinding the concrete and/or asbestos-containing materials to form concrete and/or asbestos-containing particles is helpful, for instance, in that it prepares hydrophobic components in the concrete and/or asbestos-containing materials to subsequently react in a hydrophilic environment such as acidic aqueous solution (sub-step 190). In preferred embodiments, the resulting concrete and/or asbestos-containing particles have a size of about 0.1 to 50 millimeters.

Grinding will be carried out in vacuum or under negative pressure conditions to prevent dispersion of asbestos fibers, if presents, into the environment.

Figure 3:
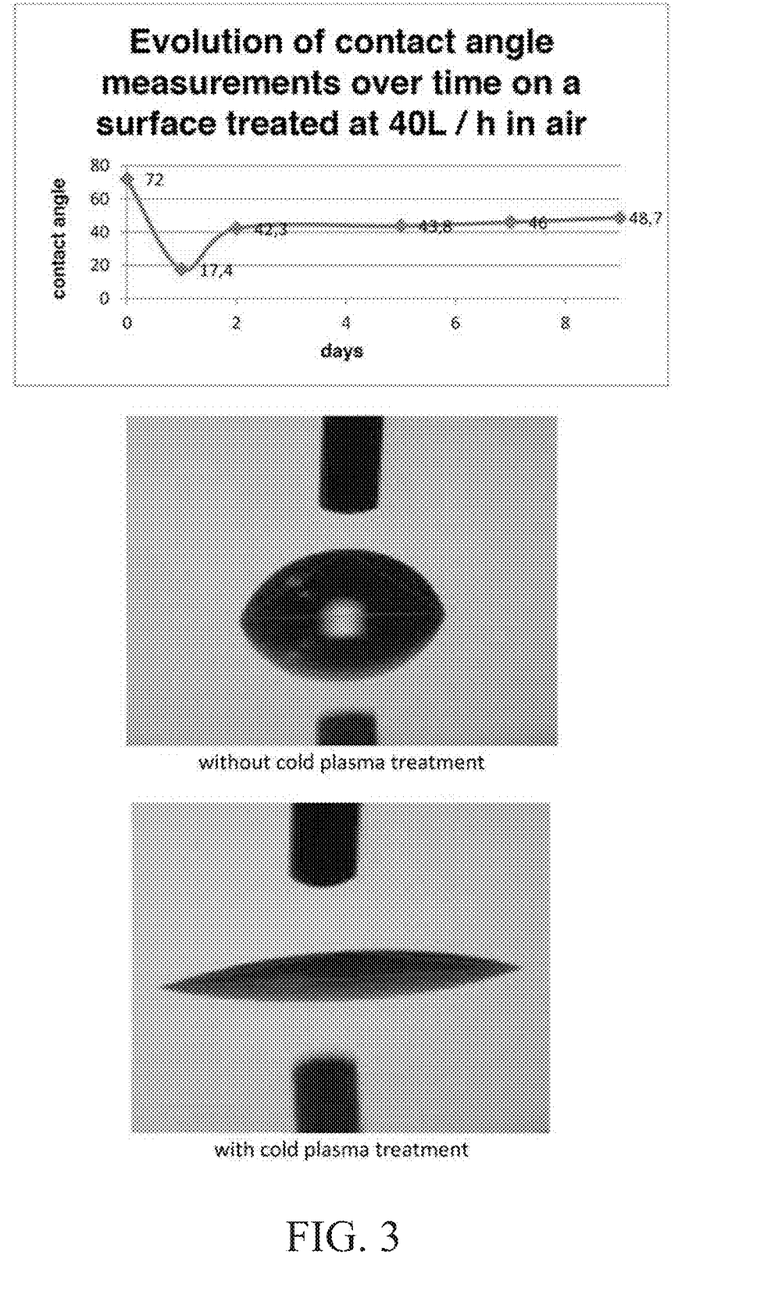
FIG. 3 presents a diagram which show that cold plasma treatment has increased the wettability and dispersion of the material (polyamide powder) by 5 times as much as the material and, from the test carried out on the plastic foil, the effect seems to be stable for a few days even at contact corner reduced by 50% compared to that measured immediately after treatment. Following the images of 2 drops: the second one was exposed to cold plasma treatment while the first no.

At sub-step 160, the concrete and/or asbestos-containing particles are superficially activated and polarized by subjection to a cold plasma torch, for purposes that will be described in greater detail hereinafter and showed in FIG. 3. The cold plasma torch that is applied to the concrete and/or asbestos-containing particles is in an ionized state and contains ionized atoms, neutral molecules, electrons, ions and radicals. The cold plasma torch is preferably a non-thermal plasma torch, also known as non-equilibrium plasma torch due to the fact that the average energy of the electrons in the plasma is much greater than that of the ions and neutrals. The cold plasma torch that is applied to the concrete and/or asbestos-containing particles is at atmospheric pressure.

The acid solution may have a pH in the range of from 0 to 6, and may include at least one of sulfuric acid, sulphurous acid, hydrochloric acid, hydrofluoric acid, phosphoric acid, phosphorous acid, nitric acid, nitrous acid, acetic acid, formic acid, lactic acid, trifluoroacetic acid and a combination thereof, without limitation. At least one inorganic and/or organic acid waste liquid from a separate industrial process will be used to prepare the acid solution. For instance and without limitation, the present process in FIG. 1 may utilize waste liquids from at least one of the following industries or industrial processes: food industry; chemical surface treatment industry for the coating of metals and other materials (e.g., galvanic processes for applying a zinc coating); phosphating processes; non-ferrous hydrometallurgy; waste treatment industry; metal surface treatment by pickling; electronic cleaning processes; alkali degreasing; and metal surface treatment by anodization.

In the event that waste liquid from the food industry will be used, the waste liquid may be acidified using selected genetically modified microorganisms. The genetically modified microorganisms are preferably selected to react with the concrete and/or asbestos-containing slurry components and disrupt the eventually presents molecular structure of the matrix material and the crystalline habit of the asbestos fibers in the asbestos-containing particles. In some embodiments, the selected microorganisms can be added to the slurry within the cavitation apparatus. In other embodiments, alternatively or additionally, the selected microorganisms can be added to the slurry by feeding the slurry to a top of a separate tower containing microorganism beds. The beds can be created by treated mussel shells or other fitted supports.

At sub-step 190, start the disruption of the molecular structure of the matrix material which also can contains the asbestos fibers. Particularly, the disruption of the crystalline habit of the asbestos fibers in the asbestos-containing particles is carried out by submerging the above-mentioned particles in the acid solution to form a slurry or suspension. The simultaneous presence of acid and cement causes a reaction between acid(s) and the particles. Having previously applied an atmospheric pressure plasma torch thus increases the surface energy of the concrete and/or asbestos-containing particles and allows the concrete and/or asbestos-containing particles to be more easily (and thus rapidly) dispersed in the acid solution, contributing to sensibly reduce the duration of the process. In addition, this accelerating and potentiating effect is synergistic with which one produced by the controlled cavitation apparatus, in the main step 200, and it can reach its state-of-the-art using the special apparatus capable of three simultaneous controlled cavitations acting in the same spaces and times.

As mentioned heretofore, the concrete and/or asbestos-containing particles are then treated at main step 200 so that cement, concrete, gypsum, vinyl or other matrix materials and, if presents, the asbestos fibers contained in the asbestos-containing particles are disrupted or denatured. As shown in the FIG. 1, step 200 of the process may include sub-steps 201, 225, 250 and 251.

Therefore, according to the process of the present invention, in sub-step 201, the slurry being treated in the cavitation apparatus (main step 200) is additivated with acidic substances or acidifying substances in order to multiply the effect of the acid solution which is at the base of the slurry formation.

Preferably, the reaction between acid solution and concrete and/or asbestos-containing particles should be carried out in a hydrodynamically-controlled cavitation apparatus. A cavitation apparatus is understood to be an apparatus for applying forces on a liquid and causing cavitation in the liquid. Cavitation is a phenomenon which involves the rapid formation and implosion of bubbles in a low-pressure area in liquids by means of mechanical forces. Due to the low pressure, the liquid vaporizes, forming cavities. At the edges of each cavity, small quantities of vapor are emitted as cavitation bubbles. The process of cavitation bubble generation and the subsequent growth and collapse of the cavitation bubbles results in very high energy densities and very high local temperatures and local pressures at the surfaces of the cavitation bubbles for a very short period of time. When they collapse, the cavitation bubbles energetically force the liquid into very small volumes, thereby creating spots of high temperature and emitting shock waves throughout the liquid. This collapse of and interaction of the acoustic waves with the cavitation bubbles is known as acoustic cavitation. Conditions in the collapsing cavitation bubbles can reach 5000° C. and 1000 bar in Just microseconds, parting from initial conditions of room temperature and 1 bar, respectively ("The temperature of cavitation"; Flint E B, Suslick K S; Science, 1991 Sep. 20; 253(5026): 1397-9; and "Ultrasonics: Fundamentals, Technologies, and Applications, Third Edition"; Dale Ensminger, Leonard J. Bond; CRC Press, 19 set 2011).

For instance and without limitation, the cavitation apparatus of the present disclosure can include a mechanical cavitation apparatus (e.g. a propeller or agitator), or a sonication apparatus preferably generating sound waves having a frequency or frequencies greater than 20 kHz to produce a cavitational effect in the liquid. The state-of-the-art of the process it is obtained by using a device capable to perform three different kind of cavitation which act simultaneously within the same spatial volumes and with reciprocal synergies. In some embodiments, once the concrete and/or asbestos-containing particles are combined with the acid solution to form the slurry, the slurry will be passed through the cavitation apparatus, in order for the slurry chemical reactions to take place simultaneously into cavitation. Alternatively or additionally, concrete and/or asbestos-containing particles can be added to the acid solution within the cavitation.

Thus, in accordance with the process in FIG. 1 disclosed herein, cavitation is carried out on the slurry during the chemical reaction. In other words, with reference to FIG. 1, at main step 200 the slurry is subjected to cavitation in the cavitation apparatus, and the effects of the cavitation are provided simultaneously to the chemical reactions between the acids and the concrete and/or asbestos-containing particles that is taking place in the slurry.

Figure 2:
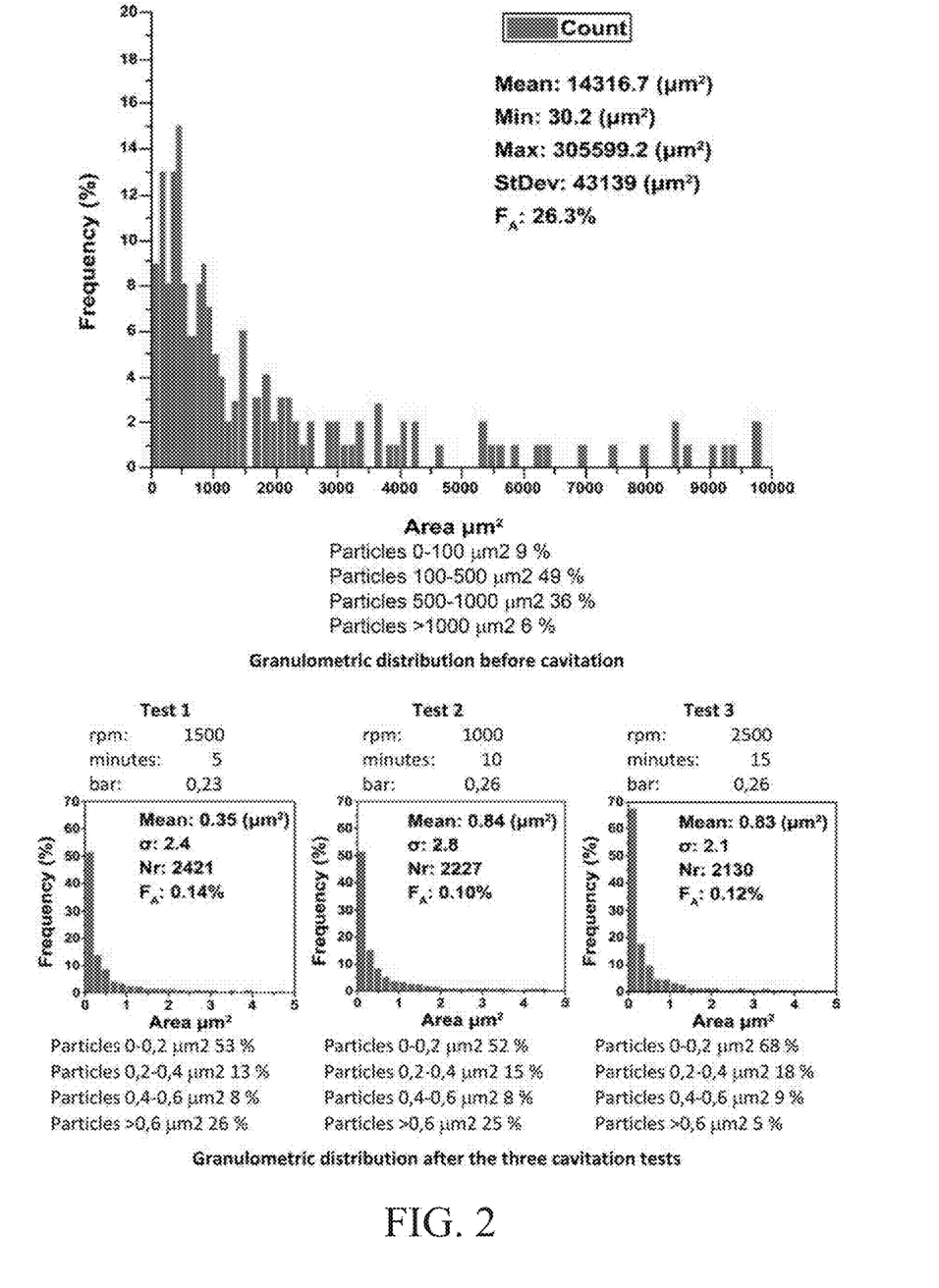

Simultaneous cavitation and acid based chemical reaction provide unexpected advantageous effects to the neutralization of acid solutions, destruction of concrete and/or denaturation of asbestos-containing materials (ACMs). Specifically, cavitation of the liquid-solid, slurry material causes a series of unique physical phenomena that affects the solids (i.e. the concrete, the asbestos, etc.) in the liquid medium (i.e. the acid solution). Microjets and high-energy shockwaves are produced in the liquid medium, and during the collapse of a cavitation bubble, high local temperatures and pressures are generated. The shockwaves induce mechanical damage such as material erosion in nearby concrete and/or asbestos-containing particles in the liquid medium. The microjets induce erosion and pitting in the surface of the concrete and/or asbestos-containing particles. Cavitation also creates high-velocity inter-particle collisions that may alter the morphology and size of the concrete and/or asbestos-containing particles dramatically. The power of the shockwaves generated by the cavitation process uniformly disrupts everything in their paths. Thus, by means of cavitation, the concrete and/or asbestos-containing particles in the slurry are fractured into even smaller concrete and/or asbestos-containing particles as shown on FIG. 2. Smaller concrete and/or asbestos-containing particles result in a better dispersion and greater surface area on which the chemical reactions with acids can take place.

Therefore, according to the process of the present invention, the asbestos-containing or concrete particles submerged in an acid solution and submitting the consequent forming slurry to a cavitation process, so that physical effects (cavitation to reduce the dimension of the particles, damage the morphology and crystal structure of the asbestos fibers if presents, etc.) and synergistic chemical effects are produced. In particular, the synergy between the cavitation and the acid reaction causes the matrix materials and asbestos fibers, if presents, to be disrupted very quickly and into smaller-sized particles.

For instance, testing has been carried out using concrete and asbestos-containing materials both having a cement matrix material. It is well-known that acid decomposes cement according to the following equation:

$$2H^+ + CaCO_3 \rightarrow Ca^{2+} + CO_2 + H_2O$$

Testing has proven that, by immersing concrete and/or asbestos-containing material in the acid solution and simultaneous submitting the forming slurry to cavitation, the above cement decomposition reaction takes place in an extremely brief period of time. Specifically, it has been observed that the amount of cement matrix material decreases in about 50 to 80 wt % in only 1 to 10 minutes. In addition, due the synergistic cavitation and acid attack (especially in the case of chrysotile asbestos), the asbestos fibers are significantly reduced in size and the crystal structure appears notably damaged; specifically, cavitation reduces the particles of the matrix and asbestos from the macroscopic to microscopic dimension, increasing the contact area between particles and acid suspension. Regarding the asbestos, the physical reduction of the particles damages the crystal habit and chemically decreases the rate of the reaction with the acid.

Thus, in accordance with the process in FIG. 1 disclosed herein, the sub-step 250 form a loop (sub-step 225) with the main step 200. The loop end when the scans made with the microscope in the third compartment of the second reactor confirm that the searched result in the reacted mixture is achieved.

In sub-step 250, as mentioned heretofore, the remaining, neutralized acid solution and the disrupted concrete and/or the denatured asbestos slurry is subjected to a hydrothermal reaction to complete transformation of the slurry into inert materials (main step 300) that are non-hazardous to human health and the environment. As shown in the figure, step 250 may include a sub-step 251.

At sub-step 250, the slurry from main step 200 is subjected to a hydrothermal reaction at high temperature and pressure conditions to hydrolyze and cause a dissolution of the undissolvable concrete and/or asbestos materials in the slurry. In some applications, the hydrothermal treatment may be carried out at a temperature of from about 50° C. to about 300° C. for a period of about 1 to 2 hours. The hydrothermal reaction may be carried out in a closed environment and by microwave, convection and/or conduction heating, for instance and without limitation. Further, in some applications, the hydrothermal reaction may cause a subcritical reaction in the slurry, the subcritical reaction including at least one of a change in the properties of crystal materials forming the asbestos materials; a reaction affecting the thermodynamic or dynamic stability of crystalline materials driving the phase transformations; dehydration of the asbestos materials; and decomposition of the asbestos materials. This can happen, however, provided that to the slurry being processed in the hydrothermal reaction, is additivated through the sub-step 251 with acidic substances (eg: phosphoric acid, etc.) or acidifying substances (eg: salmon milt, etc.), aluminum and/or its compounds and other substances (eg: hydroxyapatite, other molecules also esadvented, biological substances such as pretreated bones, etc.) that have binder/chelating power on metals contained in asbestos, especially on magnesium, in order to prevent its reformation. These substances, in part of biological origin, after reacting with asbestos, they acquire the ability to chelate heavy metals while releasing the phosphorus and the magnesium captured during this process, thus becoming more suitable for purifying polluted waters and soils. Some of them may also be used in the pharmaceutical field. All with great environmental benefits.

Preferably, the hydrothermal reaction of the asbestos-containing and/or concrete particles should be carried out in a Plug Flow Reactor. A Plug Flow Reactor is understood to be a reactor that allow a parallel reaction progress during the flow advancement, so that in each reactor's "room" the conditions are "stationary": in each internal environment, a part of the flow will be temporarily separated from the rest of the slurry and subjected to a certain chemical equilibrium and to physical variables for a given time span. However, the so fractionated process continues to be a continuous flow cycle with an obvious intrinsic decrease in management complexity despite the presence of several contemporary phases with competitive reactions that shed gases, that trasform fluids and melt solids that, by their inherent nature, tend to re-aggregate and risking to void at each stage the whole process.

For instance and without limitation, the Plug Flow Reactor of the present disclosure can be horizontal or vertical as these reactors are controlled by a pressure variation defined by external parameters and they are not dependent on gravity. The state-of-the-art is achieved with a vertical apparatus given that one of the usable reaction reagents, asbestos, is a crystalline solid that benefits from such a disposition, with three compartments defined by horizontal sectioning. The slurry enters through the upper part that will only be partially filled. The available space and the mixing of the reactants flows encourage the triggering of the reactions; the reactants are injected from different directions and perspectives in order to clash against each other by generating a turbulent fluid dynamics that shortens the triggering times of the chemical reactions and minimizes the space required for them. The dimensions of this first compartment will be calibrated according to the times deemed necessary for triggering all reactions. The actual continuous tubular reactor, fitted with internal geometric elements, constitutes the second compartment and can be separated from the former with standard valves and/or timed magnetic valves. Depending on the particular needs of the slurry under treatment, determined by the nature of the matrices used, this section may can be cooled/heated with different thermal profiles to fulfill the function of tube heat exchanger and can be stretched or shortened by removable segments or it is possible to opt for a greater number of loops between the cavitation apparatus and the reactor in order to increase the slurry contact times with the elements that are added in this process phase. In the third compartment, preferably of a conical shape, the reacted mixture is scanned by a microscope to determine if the searched result is achieved or the need for a subsequent loop through the cavitation apparatus.

As known, the reaction rate of the dissolution of concrete and/or asbestos depends on the acidity, the temperature and apparent activation energy. More specifically, the rate of a dissolution may be measured as a change in concentration of a species as a function of time. The rate law for a dissolution may be given by: $J=k[Ce-C]a[H+]b$ where k is the reaction rate parameter, C is the concentration of the measured species in the bulk solution, Ce is the steady-state concentration to which the solution tends, and a and b are the reaction orders with respect to species C and hydrogen ion concentrations respectively. Taking logs of the equation above and keeping pH constant gives: $\log J = \log k' + a \log [Ce-C]$, where $k'=k[H+]b$. Taking logs of the Arrhenius equation gives $\log k' = \log A - EA/2.303RT$, where k' is the reaction rate constant and EA is the apparent activation energy for the reaction.

Thus, in accordance with the process in FIG. 1 disclosed herein, in sub-step 251, the slurry being processed in the second reactor (sub-step 250) is additivated with acidic substances (eg: phosphoric acid, etc.) or acidifying substances (eg: salmon milt, etc.), aluminum and/or its compounds and other substances (eg: hydroxyapatite, other molecules also esadvented, biological substances such as pretreated bones, etc.) that have binder/chelating power especially on metals contained in asbestos, especially on magnesium, in order to prevent its reformation. These substances, in part of biological origin, after reacting with concrete and/or asbestos, they acquire the ability to chelate heavy metals while releasing the phosphorus and the magnesium captured during this process, thus becoming more suitable for purifying polluted waters and soils. Some of them may also be used in the pharmaceutical field. All with great environmental benefits.

The neutralization of acid solution, the destruction of concrete and/or the denaturation of asbestos-containing materials (ACMs) rate of the present process in FIG. 1 is increased due to several causes.

In the first place, the neutralization of acid solution improves the dissolution of the asbestos and/or concrete material in the slurry, as the acids reduce the instances of an opposite reaction to dissolution. For example, the dissolution of chrysotile asbestos for pH<9 during the hydrothermal treatment is the following:

$Mg_3Si_2O_5(OH)_4 + 6H^+ \to 3Mg^{+2} + H_2O^- + 2H_4SiO_4$

In the second place, the loop in sub-step 225 between hydrothermal reaction and cavitation of the present process in FIG. 1 is such that it energetically meets the dissolution of asbestos and/or concrete with the consequent neutralization of acid solution. Thus, the dissolution reaction is provided with the necessary energy for it to take place at a high rate.

During the hydrothermal reaction, the concentration of OH— increases logarithmically with time at room temperature, and the opposite reaction may occur. The presence of acids reduces the instances of the opposite reaction and, especially in presence of asbestos, thus the quantity of Mg released into the solution is increased. The additivated acidic substances—at sub-step 251—(eg: phosphoric acid, etc.) or acidifying substances (eg: salmon milt, etc.), aluminum and/or its compounds and other substances (eg: hydroxyapatite, other molecules also esadvented, biological substances such as pretreated bones, etc.) that have binder/chelating power on metals contained in asbestos, especially on Mg, prevent its reformation.

In the third place, an increase in the hydrothermal reaction temperature can exponentially accelerate the rate of the asbestos and/or concrete destruction reaction (e.g. the dissolution reaction for chrysotile asbestos indicated above), as proven by the Arrhenius equation ($d\ln k/dT = E/RT^2$, where k is the rate constant of the chemical reaction, T is the absolute temperature of the reaction, E is the activation energy, and R is the universal gas constant). In addition, the hydrothermal reaction can also be capable of changing the redox potential of the reactants.

In the fourth place, the neutralization of acid solution forming the base of the slurry is improved by the synergistic cavitation and by the dissolution of the asbestos and/or concrete material, as the smaller-sized concrete and/or asbestos particles dissolve more rapidly due to the increased contact area between the smaller-sized particles and the acid suspension.

At main step 300, liquid, solid and gaseous inert materials are obtained or recovered. The liquid inert materials may include metals such as Fe, Al, Ni, Mn, Na, Ca, K and Mg. In chrysotile asbestos Mg represents about 32 wt % of its stoichiometry. These elements may be recovered as both marketable ingots and purified salts. The solid inert materials that can include silicate, silica, phosphate, sulfate, nitrate and micro elements (Fe, Ca, K, Mn, etc.). These solid inert materials may be suitable for preparation, for example and without limitation, of any kind of chemicals. In turn, gaseous inert materials, such as CO2, for example and without limitation, may be recovered, purified and stored or used as a reagent for other process.

Since many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalents.

What is claimed is:

1. A process for the neutralization of acid wastes, the destruction of concrete and/or the denaturation of asbestos-containing materials (ACMs), comprising:

forming a slurry or suspension immerging concrete and/or asbestos-containing materials (ACMs) in an acid solution; and subjecting the slurry or suspension to hydrodynamic cavitation.

2. The process of claim 1, further comprising a step of grinding the concrete and/or asbestos-containing materials to obtain concrete and/or asbestos-containing particles, prior to the step of forming a slurry or suspension.

3. The process of claim 2, wherein the concrete and/or asbestos-containing particles obtained by grinding the concrete and/or asbestos-containing materials are sized from 0.1 to 50 millimeters.

4. The process of claim 2, further comprising a step of polarizing the concrete and/or asbestos-containing particles obtained by grinding the concrete and/or asbestos-containing materials, prior to the step of forming a slurry or suspension.

5. The process of claim 4, wherein the step of polarizing the concrete and/or asbestos-containing particles comprises subjecting the concrete and/or asbestos-containing particles to a cold plasma torch.

6. The process of claim 1, wherein the step of forming a slurry or suspension by immersing the concrete and/or asbestos-containing particles in the acid solution comprises combining the concrete and/or asbestos-containing materials with an acid solution.

7. The process of claim 1, wherein the acid solution comprises at least one inorganic acid.

8. The process of claim 1, wherein the acid solution comprises at least one organic acid.

9. The process of claim 1, wherein the acid solution comprises a waste liquid originated in a separate industrial process.

10. The process of claim 9, further comprising the step of acidifying the waste liquid.

11. The process of claim 10, wherein said step of increase the acidity of the waste liquid comprises adding genetically modified microorganisms to the waste liquid, the microorganisms reacting with components of the slurry or suspension and demolishing the molecular structure of said components.

12. The process of claim 1, further comprising a step of applying a cavitation to the forming slurry or suspension.

13. The process of claim 1, further comprising a step of applying a hydrothermal treatment to the slurry or suspension, after the step of subjecting the slurry or suspension to cavitation.

14. The process of claim 13, wherein the hydrothermal treatment is carried out in a hydrothermal reactor at a temperature of 50 to 300° C. and with an internal pressure from 1 to 60 atm.

15. The process of claim 13, further comprising a step of recovering at least one inert, secondary raw material from the slurry or suspension, after the step of applying a hydrothermal treatment to the slurry or suspension.

16. The process of claim 1, wherein the concrete and/or asbestos-containing materials, if presents, comprise at least one of a friable or compact matrix material.

17. The process of claim 16, wherein the asbestos-containing materials, if presents, comprise at least one of cement, concrete, gypsum and vinyl.

18. The process of claim 1, wherein the asbestos-containing materials, if presents, comprise natural rock containing asbestos.

19. A method for the neutralization of acid waste comprising the steps of:

forming a slurry or suspension immerging concrete and/or asbestos-containing materials in the acid solution;

subjecting the slurry or suspension to hydrodynamic cavitation;

applying a hydrothermal treatment to the slurry or suspension, after the step of subjecting the slurry or suspension to cavitation;

the hydrothermal treatment can be carried out in a Plug Flow Reactor;

produce at least one inert, secondary raw material from the slurry or suspension after hydrothermal treatment.

20. A method for the neutralization of acid waste comprising the steps of:

forming a slurry or suspension by immerging concrete and/or asbestos-containing particles in the acid solution which react chemically with the concrete and/or asbestos-containing particles;

increase the acidity of the waste liquid comprises adding genetically modified microorganisms to the waste liquid, the microorganisms reacting with components of the slurry or suspension and demolishing the molecular structure of said components;

subjecting the slurry or suspension to hydrodynamic cavitation simultaneously to the reacting of the concrete and/or asbestos-containing particles with the acid solution;

applying a hydrothermal treatment to the slurry or suspension, wherein the hydrothermal treatment is carried out in a hydrothermal reactor at a temperature of 50 to 300° C. and with an internal pressure from 1 to 60 atm;

recovering at least one inert liquid, solid or gaseous secondary raw material after the step of applying a hydrothermal treatment to the slurry or suspension.

* * * * *